United States Patent
Xia et al.

(10) Patent No.: US 12,281,369 B2
(45) Date of Patent: Apr. 22, 2025

(54) EXTRA THICK HOT ROLLED H SECTION STEEL AND PRODUCTION METHOD THEREFOR

(71) Applicant: MAANSHAN IRON & STEEL CO., LTD., Maanshan (CN)

(72) Inventors: Meng Xia, Maanshan (CN); Baoqiao Wu, Maanshan (CN); Meizhuang Wu, Maanshan (CN); Jun Xing, Maanshan (CN); Jie Wang, Maanshan (CN); Hui Chen, Maanshan (CN); Jingcheng Yan, Maanshan (CN); Qi Huang, Maanshan (CN); Lin Peng, Maanshan (CN); Junwei He, Maanshan (CN); Zhaohui Ding, Maanshan (CN); Qiancheng Shen, Maanshan (CN)

(73) Assignee: MAANSHAN IRON & STEEL CO., LTD., Maanshan (CN)

( * ) Notice: Subject to any disclaimer, the term of this patent is extended or adjusted under 35 U.S.C. 154(b) by 50 days.

(21) Appl. No.: 18/258,780

(22) PCT Filed: Oct. 27, 2021

(86) PCT No.: PCT/CN2021/126546
§ 371 (c)(1),
(2) Date: Jun. 21, 2023

(87) PCT Pub. No.: WO2022/095761
PCT Pub. Date: May 12, 2022

(65) Prior Publication Data
US 2024/0110255 A1    Apr. 4, 2024

(30) Foreign Application Priority Data
Nov. 4, 2020    (CN) .......................... 202011217422.6

(51) Int. Cl.
*C21D 1/18*    (2006.01)
*B21B 1/088*   (2006.01)
(Continued)

(52) U.S. Cl.
CPC ............ *C21D 9/0068* (2013.01); *B21B 1/088* (2013.01); *C21D 1/18* (2013.01); *C21D 1/84* (2013.01);
(Continued)

(58) Field of Classification Search
CPC .. B21B 1/088; C21D 1/02; C21D 1/18; C21D 1/60; C21D 1/84; C21D 2211/001;
(Continued)

(56) References Cited

U.S. PATENT DOCUMENTS

| 2015/0204071 A1* | 7/2015 | Mizoguchi | C21D 6/004 148/506 |
| 2021/0140024 A1* | 5/2021 | Mizoguchi | C22C 38/54 |

FOREIGN PATENT DOCUMENTS

| CN | 103987866 B | 8/2014 |
| CN | 104487604 A | 4/2015 |

(Continued)

OTHER PUBLICATIONS

International Search Report dated Feb. 9, 2022 for International Application No. PCT/CN2021/126546.

*Primary Examiner* — Jie Yang

(57) ABSTRACT

The present invention discloses a extra thick hot rolled H section steel and a production method therefor. The extra thick hot rolled H section steel contains, by mass, the following chemical components: 0.04-0.11% of C, 0.10-0.40% of Si, 0.40-1.00% of Mn, 0.40-1.00% of Cr, 0.10-0.40% of Cu, 0.020-0.060% of Nb, 0.040-0.100% of V, 0.010-0.025% of Ti, 0.010-0.030% of Al, 0.0060-0.0120% of N, not more than 0.015% of P, not more than 0.005% of (Continued)

S, not more than 0.0060% of O, and the balance Fe and trace residual elements, wherein 0.090%≤Nb+V+Ti≤0.170%, 6.5≤(V+Ti)/N≤10.5, and 0.30%≤CEV≤0.48%. The extra thick hot rolled H section steel has a flange thickness of 90 mm-150 mm, has excellent comprehensive mechanical properties, and can well meet the needs for heavy supporting structural parts of high-rise buildings, large squares, bridge structures, etc.

15 Claims, 2 Drawing Sheets

(51) Int. Cl.
  *C21D 1/84*   (2006.01)
  *C21D 6/00*   (2006.01)
  *C21D 8/00*   (2006.01)
  *C21D 9/00*   (2006.01)
  *C22C 38/00*   (2006.01)
  *C22C 38/02*   (2006.01)
  *C22C 38/04*   (2006.01)
  *C22C 38/06*   (2006.01)
  *C22C 38/42*   (2006.01)
  *C22C 38/46*   (2006.01)
  *C22C 38/48*   (2006.01)
  *C22C 38/50*   (2006.01)

(52) U.S. Cl.
  CPC .............. *C21D 6/004* (2013.01); *C21D 6/005* (2013.01); *C21D 6/008* (2013.01); *C21D 8/005* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/46* (2013.01); *C22C 38/48* (2013.01); *C22C 38/50* (2013.01); *C21D 2211/002* (2013.01); *C21D 2211/005* (2013.01)

(58) Field of Classification Search
  CPC ........ C21D 2211/002; C21D 2211/005; C21D 6/002; C21D 6/004; C21D 6/005; C21D 6/008; C21D 7/13; C21D 8/005; C21D 9/0068; C22C 38/001; C22C 38/002; C22C 38/02; C22C 38/04; C22C 38/06; C22C 38/20; C22C 38/24; C22C 38/26; C22C 38/28; C22C 38/42; C22C 38/46; C22C 38/48; C22C 38/50; Y02P 10/20
  See application file for complete search history.

(56) References Cited

FOREIGN PATENT DOCUMENTS

| | | |
|---|---|---|
| CN | 109715842 A | 5/2019 |
| CN | 107964626 B | 9/2019 |
| CN | 110291218 A | 9/2019 |
| CN | 107747043 B | 10/2019 |
| CN | 112458364 A | 3/2021 |
| JP | 1060576 A | 3/1998 |
| JP | 2016084524 A | 5/2016 |

\* cited by examiner

EXTRA THICK HOT ROLLED H SECTION STEEL AND PRODUCTION METHOD THEREFOR

TECHNICAL FIELD

The present invention relates to the technical field of metal material production, in particular to a extra thick hot rolled H section steel and production method therefor.

BACKGROUND ART

With the rapid development of our economy and society, people have increasingly higher demands for safety, comfort and attractive appearance of buildings such as high-rise buildings, large venues and main towers of bridges. Therefore, the design of a heavy steel structure is adopted, and a extra thick hot rolled H section steel having a flange thickness of 90 mm-150 mm is the core supporting member of this structure.

Long-term practice has proved that the comprehensive mechanical properties of a hot rolled H section steel flange are lower than those of a web. Also, in this industry, a flange of the hot rolled H section steel is generally sampled to serve as a descriptive object for mechanical performance evaluation as stipulated in the standard GB/T2975. It is recognized in the industry that steels are rolled from large-thickness beam blank obtain excellent mechanical properties by high reduction rolling. However, this method for rolling the extra thick hot rolled H— beam having a flange thickness of 90 mm-150 mm requires ultra-thick and ultra-large beam blank considerably greater than a current size, and needs the investment and construction of new continuous casting equipment and steel rolling equipment, resulting in huge costs, and it is extremely difficult to control the internal and surface quality of the beam blank, so it is impossible to implement this method. Considering the feasibility and economical efficiency, it is acceptable to roll beam blank, with a reduction rate of 13-30% from the beam blank to finished products in a thickness direction of flanges.

According to the patent document with publication No. CN103987866B, a special-shaped billet with a Ni—Cu—B—V—Ti alloy system is used and undergoes the processes of heating, rough rolling and finish rolling, and a room temperature microstructure of bainite and ferrite/martensite is formed by means of cooling between finishing rolling passes or rapid cooling after rolling, thereby producing a hot-rolled H section steel which has a flange thickness of 100 mm-150 mm and a yield strength of not less than 450 MPa. According to the patent document with publication No. CN109715842A, a special-shaped billet with a Nb—V—Ti alloy system (Cr, Mo, Ni and Cu elements may be added) is used and undergoes the processes of heating, rough rolling and finish rolling, a room temperature microstructure of ferrite and martensite/austenite is formed by means of cooling between finishing rolling passes or rapid cooling after rolling, thereby producing a hot-rolled H section steel which has a flange thickness of 40 mm-140 mm and a yield strength of not less than 450 MPa. The above two methods each require that the bainite content is not less than 60% and the ferrite content is not less than 60% at one quarter of the flange thickness (with a grain size being not greater than 35 m), but the microstructure, morphology and content in a full thickness direction of the flange are not regulated. When these methods are applied to the production of products having a flange thickness of 90 mm or more, the thickness-direction properties cannot be guaranteed.

According to the patent documents with publication No. CN107964626B and CN107747043B, the former uses a special-shaped billet with a Nb—B alloy system, which undergoes the processes of heating, rough rolling, finish rolling, quenching and tempering to form a room temperature microstructure of tempered sorbite, ferrite and dispersed carbides, the latter uses a special-shaped billet with a V—Ti—Ni—Mo—Cu—Cr—Al alloy system, which undergoes the processes of heating, rough rolling, finish rolling, quenching and offline tempering to form a tempered martensitic microstructure, thereby producing a hot-rolled H section steel with a yield strength of 500 MPa-650 MPa. The above two methods are intended to produce products with thinner flanges, which need to satisfy rapid cooling conditions in a full thickness direction. If these methods are applied to the production of products having a flange thickness of 90 mm or more, the critical cooling rate for quenching in the full thickness direction cannot be reached, an original microstructure required for online or offline heat treatment cannot be obtained, the microstructure of sorbite/martensite and dispersed carbides cannot be formed due to a high initial temperature and a low cooling rate of core cooling, the strength, plasticity, toughness and thickness-direction properties of the products cannot be ensured, and the addition of Ni, Mo and other elements will result in an increase in the costs of the alloys.

In conclusion, there is an urgent need for a extra thick hot rolled H section steel and the production method therefor to solve these problems.

SUMMARY

1. Problem to be Solved

The present invention aims to provide a extra thick hot rolled H section steel and the production method therefor in order to solve the problem that the mechanical properties of a hot rolled H section steel having a flange thickness of 90 mm-150 mm, especially those in a thickness direction, are required to be improved.

2. Technical Solution

In order to solve the above-mentioned problem, the technical solution adopted by the present invention is as follows:

A extra thick hot rolled H section steel contains, by mass, the following chemical components: 0.04-0.11% of C, 0.10-0.40% of Si, 0.40-1.00% of Mn, 0.40-1.00% of Cr, 0.10-0.40% of Cu, 0.020-0.060% of Nb, 0.040-0.100% of V, 0.010-0.025% of Ti, 0.010-0.030% of Al, 0.0060-0.0120% of N, not more than 0.015% of P, not more than 0.005% of S, not more than 0.0060% of O, and the balance Fe and trace residual elements, wherein 0.090%≤Nb+V+Ti≤0.170%, 6.5≤(V+Ti)/N≤10.5, and the chemical components satisfy the condition of 0.30%≤CEV≤0.48% according to a calculation equation CEV=C+Mn/6+(Cr+Mo+V)/5+(Ni+Cu)/15.

Optionally, the H section steel contains, by mass, the chemical components: 0.04-0.07% of C, 0.10-0.30% of Si, 0.80-1.00% of Mn, 0.40-0.90% of Cr, 0.10-0.25% of Cu, 0.040-0.060% of Nb, 0.040-0.080% of V, 0.010-0.015% of Ti, 0.010-0.020% of Al, 0.0060-0.0100% of N, not more than 0.015% of P, not more than 0.005% of S, not more than 0.0060% of O, and the balance Fe and trace residual elements, wherein 0.090%≤Nb+V+Ti≤0.130%, 6.5≤(V+Ti)/N≤8.5, and the chemical components satisfy the condition of 0.30%≤CEV≤0.43% according to the calculation equation CEV=C+Mn/6+(Cr+Mo+V)/5+(Ni+Cu)/15.

Optionally, the H section steel contains, by mass, the chemical components: 0.07-0.11% of C, 0.30-0.40% of Si, 0.40-0.80% of Mn, 0.90-1.00% of Cr, 0.25-0.40% of Cu, 0.020-0.040% of Nb, 0.080-0.100% of V, 0.015-0.025% of Ti, 0.020-0.030% of Al, 0.0100-0.0120% of N, not more than 0.015% of P, not more than 0.005% of S, not more than 0.0040% of O, and the balance Fe and trace residual elements, wherein 0.130%<Nb+V+Ti≤0.170%, 8.5≤(V+Ti)/N≤10.5, and the chemical components satisfy the condition of 0.40%≤CEV≤0.48% according to the calculation equation CEV=C+Mn/6+(Cr+Mo+V)/5+(Ni+Cu)/15.

Preferably, at the part, one sixth of the width distance from an end portion and one quarter of the thickness from outer surface, of a flange of the H section steel, the microstructure contains, by area, 85-98% of acicular ferrite and the balance bainite or retained austenite, wherein the bainite content is not more than 2%, the ferrite has a grain width size of not more than 40 m, and the difference of acicular ferrite contents in different zones through thickness of the flange is not more than 16%.

Optionally, at the part, one sixth of the width distance from the end portion and one quarter of the thickness from outer surface, of the flange of the H section steel, the microstructure contains, by area, 85-91% of acicular ferrite and the balance bainite or retained austenite, wherein the bainite content is not more than 2%, the ferrite has a grain width size of not more than 20 μm, and the difference of acicular ferrite contents in different zones through thickness of the flange is not more than 9%.

Optionally, at the part, one sixth of the widthdistance from the end portion and one quarter of the thickness from outer surface, of the flange of the H section steel, the microstructure contains, by area, 91-98% of acicular ferrite and the balance bainite or retained austenite, wherein the bainite content is not more than 1%, the ferrite has a grain width size of 20 μm-40 μm, and the difference of acicular ferrite contents in different zones through thickness of the flange is 9-16%.

Preferably, at the part, one sixth of the width distance from the end portion and one quarter of the thickness from outer surface, of the flange of the H section steel, the tensile yield strength at the room temperature is not less than 460 MPa, the tensile strength is not less than 540 MPa, and the elongation after fracture is not less than 24.0%; the impact energy value at −20° C. is not less than 80 J, and the thickness-direction properties reach grade Z35.

Preferably, the flange thickness of the H section steel is 90 mm-150 mm.

According to another technical solution provided by the present invention, a production method for the extra thick hot rolled H section steel according to any one of claims 1-8, comprising the following steps: heating a beam blank at a heating temperature of 1200° C.-1350° C. for a heating time of 120 min-180 min; break down rolling, wherein the surface temperature of the flange after rolling is not lower than 1000° C.; performing cooling by spraying water at a cooling rate of not lower than 20° C./s, and rapidly cooling the flange surface to 700° C.-800° C., and then performing rolling with a universal rolling mill; and after the universal rolling, rapidly cooling, by spraying water, the flange surface of the rolled piece to 480° C.-530° C. at a cooling rate of 5° C./s–13° C./s, then performing air cooling.

Preferably, the sbeam blank undergoes break down rolling, and the surface temperature of the flange after rolling is not lower than 1020° C.

3. Beneficial Effects

Compared with the prior art, the present invention has the beneficial effects:

1. The extra thick hot rolled H section steel has the flange thickness of 90 mm-150 mm and excellent comprehensive mechanical properties, and can meet the requirements for the yield strength of not less than 460 MPa, the tensile strength of not less than 540 MPa, the elongation after fracture of not less than 24.0%, and the impact energy value at −20° C. of not less than 80 J, especially has the minimum properties reaching the grade Z35 in the thickness direction, and can well meet the demands for heavy supporting structures such as high-rise buildings, large squares, and bridge structures.

2. According to the production method for the extra thick hot rolled H section steel, by means of rapid cooling before universal rolling, a certain temperature gradient can be formed in the thickness direction of the flange from the surface to the core; during the rolling, the surface temperature is low and the deformation resistance is high, as the rolling, the deformation gradually penetrate into the core with higher temperature and lower deformation resistance; as the temperature gradient increases, a deforming penetration effect is improved, a strain accumulation in the core increases, the difference of strain accumulations from the surface to the core decreases accordingly. By increasing the number of nucleation sites and a driving force, the precipitation and refinement of the acicular ferrite are promoted; the difference of strain accumulations through thickness of the flange is reduced, which is conductive to reducing the difference of microstructure in different zones through thickness and improving the microstructural uniformity.

3. With the production method for the extra thick hot rolled H section steel, the room temperature microstructure containing the main component acicular ferrite and the balance bainite or residual austenite is formed by means of chemical composition control, rapid cooling before universal rolling, and segmental cooling after rolling, the acicular ferrite content, grain size and bainite content are limited, the microstructure difference through thickness of the flange is reduced, and the extra thick hot rolled H section steel with excellent comprehensive mechanical properties is obtained under the combined effect of strengthening from microstructure, precipitation, solution and fine grain, has relatively low production costs and good production feasibility, and is suitable for mass production and application.

DETAILED DESCRIPTION OF EMBODIMENTS

Figure 1:
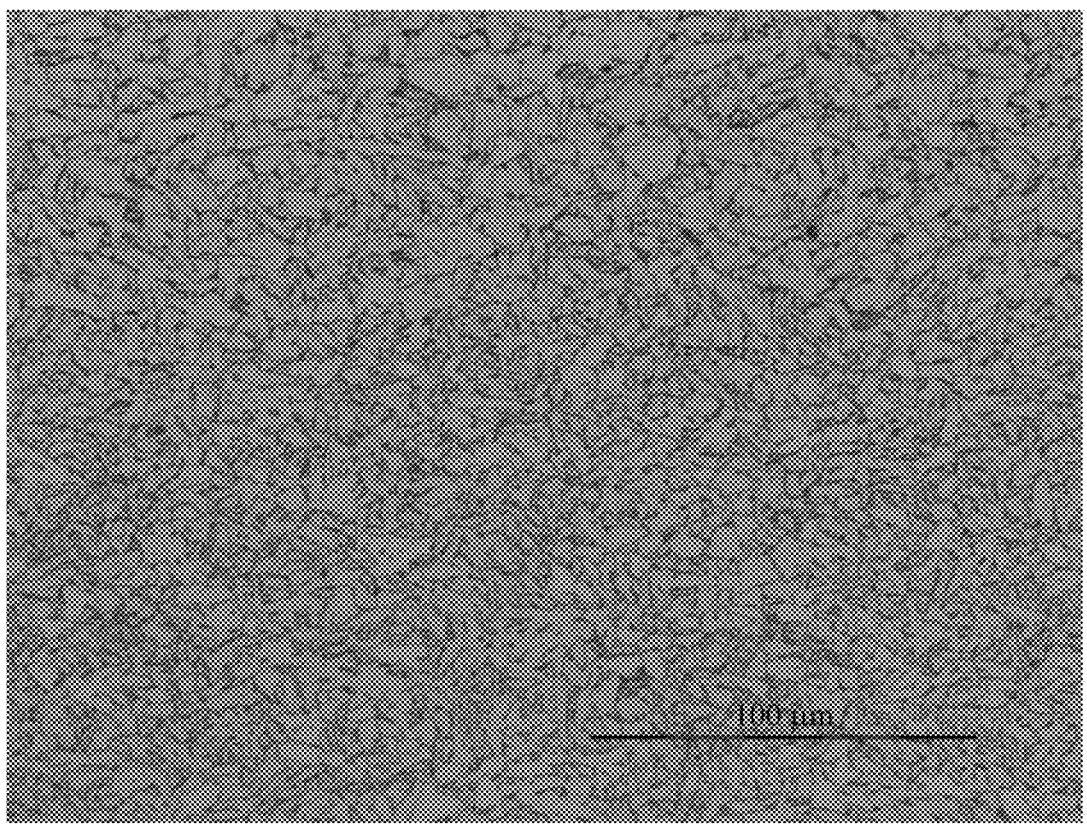
FIG. 1 is a diagram showing a typical microstructure of a H section steel according to the present invention at the room temperature.
Figure 2:
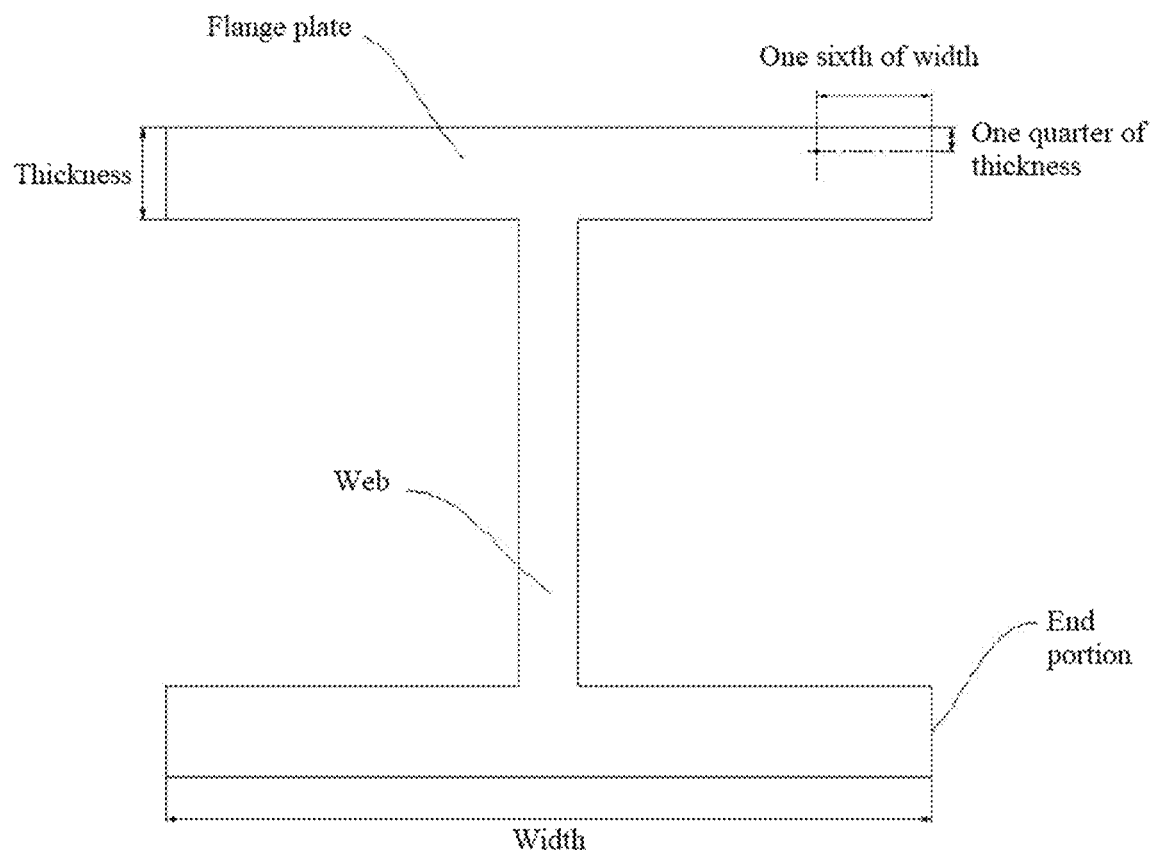
FIG. 2 is a schematic structural diagram of a common H section steel, in which the part of the flange one sixth of the width distance from an end portion and one quarter of the thickness from outer surface is marked.

An extra thick hot rolled H section steel of the present invention contains, by mass, the following chemical components: 0.04-0.11% of C, 0.10-0.40% of Si, 0.40-1.00% of Mn, 0.40-1.00% of Cr, 0.10-0.40% of Cu, 0.020-0.060% of Nb, 0.040-0.100% of V, 0.010-0.025% of Ti, 0.010-0.030% of Al, 0.0060-0.0120% of N, not more than 0.015% of P, not more than 0.005% of S, not more than 0.0060% of O, and the balance Fe and trace residual elements, wherein 0.090%≤Nb+V+Ti≤0.170%, 6.5≤(V+Ti)/N≤10.5, and the chemical components satisfy the condition of 0.30%≤CEV≤0.48% according to a calculation equation CEV=C+Mn/6+(Cr+Mo+V)/5+(Ni+Cu)/15.

Further optionally, the chemical components include, by mass, 0.04-0.07% of C, 0.10-0.30% of Si, 0.80-1.00% of Mn, 0.40-0.90% of Cr, 0.10-0.25% of Cu, 0.040-0.060% of Nb, 0.040-0.080% of V, 0.010-0.015% of Ti, 0.010-0.020% of Al, 0.0060-0.0100% of N, not more than 0.015% of P, not more than 0.005% of S, not more than 0.0060% of O, and the balance Fe and trace residual elements, wherein 0.090%≤Nb+V+Ti≤0.130%, 6.5≤(V+Ti)/N≤8.5, and the chemical components satisfy the condition of 0.30%≤CEV≤0.43% according to the calculation equation CEV=C+Mn/6+(Cr+Mo+V)/5+(Ni+Cu)/15.

Further optionally, the chemical components include, by mass, 0.07-0.11% of C, 0.30-0.40% of Si, 0.40-0.80% of Mn, 0.90-1.00% of Cr, 0.25-0.40% of Cu, 0.020-0.040% of Nb, 0.080-0.100% of V, 0.015-0.025% of Ti, 0.020-0.030% of Al, 0.0100-0.0120% of N, not more than 0.015% of P, not more than 0.005% of S, not more than 0.0040% of O, and the balance Fe and trace residual elements, wherein 0.130%<Nb+V+Ti≤0.170%, 8.5≤(V+Ti)/N≤10.5, and the chemical components satisfy the condition of 0.40%≤CEV≤0.48% according to the calculation equation CEV=C+Mn/6+(Cr+Mo+V)/5+(Ni+Cu)/15.

Specifically, the effects of the elements and the composition proportion (by mass percentage) are based on the following:

Carbon (C): It is intended to improve strength. In order to obtain this effect, the lower limit of its content is set to 0.04%; if the content exceeds 0.11%, carbides will precipitate in the form of chains or short rods during the formation of acicular ferrite, destroying the continuity of a matrix and impairing the plasticity, toughness and thickness-direction properties; also, this component is close to a peritectic zone, cracks are likely to occur at an end portion and an internal fillet of a special-shaped billet, which will adversely affect the weldability. Therefore, the upper limit is set to 0.11%.

Silicon (Si): It is a deoxidizing element in steelmaking, and is intended to enhance the strength and improve the fluidity of molten steel during continuous casting. In order to obtain this effect, the lower limit of its content is set to 0.10%; if the content exceeds 0.40%, the strength enhancing effect will be sufficient, resulting in the formation of a mixed microstructure of martensite and austenite, and impairing plasticity and toughness. Therefore, the upper limit is set to 0.40%.

Manganese (Mn): It is intended to improve hardenability, synergize with the Cr element to increase the stability of supercooled austenite, promote the precipitation of acicular ferrite and improve the thickness-direction properties to a certain extent, and can also enhance the strength. In order to obtain the effect, the lower limit of its content is set to 0.40%; if the content exceeds 1.00%, it is likely to cause the segregation of macroscopic components, pearlite or bainite or retained austenite will be distributed in bands, destroying the continuity of a matrix and impairing the thickness-direction properties. Therefore, the upper limit is set to 1.00%.

Chromium (Cr): It is intended to improve hardenability, synergize with the Mn element to increase the stability of supercooled austenite, promote the precipitation of acicular ferrite and improve the thickness-direction properties to a certain extent, and can also enhance the strength. In order to obtain the effect, the lower limit of its content is set to 0.40%; if the content exceeds 1.00%, the strength enhancing effect will be saturate, promoting the formation of up bainite, impairing plasticity and toughness, and adversely affecting weldability. Therefore, the upper limit is set to 1.00%.

Copper (Cu): It is intended to improve strength. In order to obtain this effect, the lower limit of its content is set to 0.10%; if the content exceeds 0.40%, a liquation defect will be formed on the surface of the beam blank. Therefore, the upper limit is set to 0.40%.

Niobium (Nb): It precipitates during rolling to prevent the growth of austenite grains, increase a critical temperature of an austenite non-recrystallization zone and increase strain accumulation, helps to refine acicular ferrite, and can also improve the work-hardening capacity of the surface and a superficial zone, enhance deforming penetration, and improve plasticity, toughness and thickness-direction properties. In order to obtain this effect, the lower limit of this component is set to 0.020%; if the content exceeds 0.060%, the effect of the critical temperature of austenite non-recrystallization is sufficient, and a precipitate will aggregate and coarsen, reducing a pinning effect. Therefore, the upper limit is set to 0.060%.

Vanadium (V): It disperses and precipitates after rolling to increase the strength. In order to obtain this effect, the lower limit of its content is set at 0.040%; if the content exceeds 0.100%, the precipitate will severely coarsen, and cracks are likely to occur at a junction of large grains and a matrix, impairing plasticity and toughness, and adversely affecting weldability. Therefore, the upper limit is set to 0.100%.

Titanium (Ti): It precipitates at heating and rolling stages to prevent excessive growth of austenite grains. In order to obtain this effect, the lower limit of this content is set to 0.010%; if the content exceeds 0.025%, a precipitate will aggregate and coarsen, reduce a pinning effect and forming more phases with sharp corners to impair the toughness. Therefore, the upper limit is set to 0.025%.

Aluminum (Al): It is a deoxidizing element in steelmaking and precipitates during rolling to prevent excessive growth of austenite grains. In order to obtain this effect, the lower limit of this content is set to 0.010%; if the content exceeds 0.030%, it is likely to form brittle inclusions, impairing the plasticity, toughness and thickness-direction properties, and it is also likely to form alumina scale during continuous casting, which will cause breakouts. Therefore, the upper limit is set to 0.030%.

Nitrogen (N): The N element has a synergistic effect on the precipitation of Ti, V, and Nb, and significantly affects precipitation quantities and distributions of Ti and V. With the increase of the N content, the precipitation ratio increases greatly. In order to obtain this effect, the lower limit of its content is set to 0.0060%; if the content exceeds 0.0120%, the promotion effect on precipitation will be sufficient, and it will also promote the formation of island martensite, impairing the plasticity and toughness. Therefore, the upper limit is set to 0.0120%.

In order to give full play to the beneficial effects of the precipitation of Nb, V and Ti elements, the lower limit of Nb+V+Ti is set to 0.090%; if the total content of the three elements is higher than 0.170%, precipitated grains will be severely coarsened, impairing the toughness and plasticity. Therefore, the upper limit of Nb+V+Ti is set to 0.170%. Since the precipitation of Ti and V need the synergistic effect of the N element, if the ratio of the total content of V and Ti elements to the content of the N element is lower than 6.5, the N content required for precipitation will be excessive, and a gas content in the steel will increase, impairing the toughness, so the lower limit of (V+Ti)/N is set to 6.5; if the ratio is higher than 10.5, the proportion of the precipitation amount of Ti and V elements accounting for the total content is lower, and the precipitation strengthening effect is insufficient. Therefore, the upper limit of (V+Ti)/N is set to 10.5.

According to the standard GB/T 1591, the CEV is a value calculated based on the content of the above elements, and it is also a reference index for evaluating the weldability. In order to effectively play the role of each chemical component, the CEV is not less than 0.30%, and the lower limit thereof is set to 0.30%. As the CEV increases, the workload of preparation before welding and the sensitivity to cold cracking after welding will increase in use. In order to facilitate the subsequent welding and use of the product, the upper limit is set to 0.48%.

Phosphorus (P): It is a residual element, which is easy to solidify, segregate and enrich, impairing the plasticity and toughness, and has an adverse effect on the weldability. Therefore, the upper limit is set to 0.015%.

Sulfur (S): It is a residual element, easy to form an elongated inclusion after rolling, has a disordered arrangement of atoms and a high energy at a contact surface, and is likely to cause cracks, impairing the toughness and thickness-direction properties. Therefore, the upper limit is set to 0.005%.

Oxygen (O): It is a residual element, forms an oxide inclusion with various elements, and causes a brittle failure base point, impairing the plasticity, toughness and thickness-direction properties. Therefore, the upper limit is set to 0.0060%.

According to the standard GB/T 2975, with regard to the extra thick hot rolled H section steel of the present invention, the part of a flange one sixth of the width from the end portion and one quarter of the thickness from outer surface is sampled to evaluate the mechanical properties, and this part is also taken to characterize the microstructure. The microstructure contains, by area, 85-98% of acicular ferrite and the balance bainite or retained austenite, wherein the bainite content is not more than 2%, the ferrite has a grain width size of not more than 40 m, and the difference of acicular ferrite contents in different zones through thickness of the flange is not more than 16%.

Further optionally, at the part of the flange one sixth of the width from the end portion and one quarter of the thickness from outer surface, the microstructure contains, by area, 85-91% of acicular ferrite and the balance bainite and retained austenite, wherein the bainite content is not more than 2%, the ferrite has a grain width size of not more than 20 m, and the difference of acicular ferrite contents in different regions through thickness of the flange should not be more than 9%.

Further optionally, at the part of the flange one sixth of the width from the end portion and one quarter of the thickness from outer surface, the microstructure contains, by area, 91-98% of acicular ferrite and the balance bainite and retained austenite, wherein the bainite content is not more than 1%, the ferrite has a grain width size of 20 μm-40 μm, and the difference of acicular ferrite contents in different regions through thickness of the flange is 9-16%.

Since the major axis direction of the acicular ferrite is not fixed, an interlocking structure is formed at its grain boundary, and the acicular ferrite has the same distribution in the thickness direction of the flange. The acicular ferrite is obviously better than the bainite and pearlite in improving the plasticity, toughness and thickness-direction properties. The effect of increasing strength of the acicular ferrite is also higher than that of the pearlite, and it is the key microstructure to improve the comprehensive mechanical properties of the product.

If the acicular ferrite content is less than 85% at the part of the flange one sixth of the width from the end portion and one quarter of the thickness from outer surface, the total content of the acicular ferrite in a full thickness range is insufficient, the pearlite may even appear, and the beneficial effect of the acicular ferrite cannot be fully exerted, impairing the plasticity, toughness and thickness-direction properties. Therefore, the lower limit of its content is set to 85%; The C element is inevitably enriched in other zones when the acicular ferrite precipitates, and bainite or retained austenite is formed in the cooling process after rolling, and cannot be completely converted into the acicular ferrite. Therefore, the upper limit of its content is set to 98%.

Since the distribution of the precipitated bainite is relatively concentrated, the continuity of the matrix is destroyed. If the content thereof exceeds 2%, the plasticity and toughness will be impaired. Therefore, the upper limit is set to 2%.

The acicular ferrite grains are in the form of short rods, generally with a length-width ratio of 2:1 to 5:1. It is a feasible method to limit the width thereof. By reducing the grain size, the strength, plasticity and toughness can be improved, and the uniformity of the grain size in the thickness direction can be improved, which are conducive to improving the thickness-direction properties. If the width is greater than 40 m, the comprehensive mechanical properties will be reduced. Therefore, the upper limit of the width size thereof is set to 40 m.

If the difference of the acicular ferrite contents in the thickness direction of the flange exceeds 16%, the plasticity difference in different zones will increase. When the steel is subjected to a tensile effect in the thickness direction, the different zones cannot coordinate for deformation, and the stress difference of two sides of the boundary exceeds a crack nucleation energy, likely forming a source of cracks and impairing the thickness-direction properties. Therefore, the difference of the acicular ferrite contents in different zones through thickness of the flange is set to be not more than 16%.

A production method for the extra thick hot rolled H section steel of the present invention includes the main production processes: molten iron pretreatment→converter smelting→argon blowing, LF furnace refining→beam blank heating→break down rolling→universal rolling (rapid cooling before rolling)→segmental cooling after rolling (rapid cooling+air cooling).

The production method for the extra thick hot rolled H section steel of the present invention adopts a beam blank for rolling, the heating temperature of the beam blank is controlled to be in a range of 1200° C.-1350° C., and the heating time is not less than 120 min.

Further optionally, the heating temperature is 1200° C.-1260° C., and the heating time is 122 min-144 min.

Further optionally, the heating temperature is 1260° C.-1350° C., and the heating time is 168 min-173 min.

The purpose of beam blank heating is to achieve solution of the alloy components, homogenize the structure, and reduce the rolling deformation resistance.

If the temperature is lower than 1200° C., the alloying elements do not have enough time for solution, and the precipitate containing the Ti and Nb elements form grains of uneven sizes during the precipitation, cannot be dispersedly distributed, and cannot play the roles of pinning and strengthening. Therefore, the lower limit is set to 1200° C.;

if the temperature exceeds 1350° C., the original grain size will increase, which is not conducive to the dispersed distribution of the precipitate, and overburning is likely to occur, resulting in surface and superficial cracks. Therefore, the upper limit is set to 1350° C.

If the heating time is less than 120 min, the core of the beam blank will not be burnt through, and the solution and homogenization of the alloy elements will not be sufficient. Therefore, the lower limit is set to 120 min. Considering economical efficiency of mass production, such as reducing loss of iron scale and heating energy consumption, should not exceed 180 min.

According to the production method for the extra thick hot rolled H section steel of the present invention, after the break down rolling, the surface temperature of the flange is not lower than 1000° C.

Further optionally, the surface temperature of the flange is not lower than 1020° C.

Further optionally, the surface temperature of the flange is not lower than 1050° C.

The break down rolling are intended to reshape the billet and provide a suitable billet shape for universal rolling. Controlling the surface temperature of the flange after break down rolling aims to form a certain temperature gradient from the surface to the core by means of rapid cooling, so as to enhance the deforming penetration at a universal rolling stage. After break down rolling, the core temperature core of the flange is higher than the surface temperature. If the surface temperature is lower than 1000° C., the core temperature is lower than 1100° C. When the flange surface is rapidly cooled at the universal rolling stage, the overall thermal capacity is low, the temperature drop of the core is fast, and an effective temperature gradient cannot be formed from the surface to the core, affecting the effect of deforming penetration. Therefore, the lower limit is set to 1100° C.

According to the production method for the extra thick hot rolled H section steel of the present invention, before the universal rolling, the flange surface is cooled to 700-800° C. by spraying water at a cooling rate of not lower than 20° C./s, and rolling is then performed with a universal rolling mill.

Further optionally, before the universal rolling, the flange surface is cooled to 740-800° C. by spraying water at a cooling rate of not lower than 22° C./s, and rolling is then performed with the universal rolling mill.

Further optionally, before the universal rolling, the flange surface is cooled to 700-740° C. by spraying water at a cooling rate of not lower than 32° C./s, and rolling is then performed with the universal rolling mill.

The universal rolling is intended to perform compressing deformation in the thickness direction of the flange and a web so as to obtain a finished product with required shape and size.

The rapid cooling before universal rolling is intended to form a certain temperature gradient from the surface to the core in the thickness direction of the flange. During the rolling, the surface temperature is low, and the deformation resistance is large. As the compressing deformation in rolling continues, the deformation will gradually penetrate into the core with higher temperature and small deformation resistance. Practice indicates that as the temperature gradient increases, the deforming penetration effect is enhanced, the strain accumulation in the core increases, and the difference of strain accumulations decreases accordingly from the surface to the core. By increasing the strain accumulation, the number of nucleation sites and driving force, and the precipitation and refinement of the acicular ferrite are promoted; reducing the strain accumulation difference in the thickness direction of the flange is conducive to reducing the difference of the microstructure contents of different zones in the thickness direction and improving the microstructural uniformity.

Since it is inconvenient to quickly measure the temperature of the flange core during production, the easily measured surface temperature is used as a process parameter.

If the cooling rate is lower than 20° C./s, the surface cooling rate is too low, the heat in the core has enough time to be conducted to the surface, and thus the effective temperature gradient cannot be obtained.

If the cooling temperature of the flange surface is cooled to 700° C. or below, the temperature of the core will be lower, the deformation resistance of this zone will increase, affecting the deforming penetration effect, the energy consumption will be too large, and therefore the lower limit is set to 700° C.; if the temperature is higher than 800° C., the degree of surface work-hardening is insufficient, the deformation is still concentrated on the surface, affecting the deforming penetration effect, and therefore the upper limit is set to 800° C.

According to the production method for the extra thick hot rolled H section steel of the present invention, after the universal rolling, the flange surface of a rolled piece is cooled to 480° C.-530° C. by spraying water at a cooling rate of 5° C./s–13° C./s, and is then air-cooled, generally with a cooling bed.

Further optionally, after the universal rolling, the flange surface is cooled to 505° C.-530° C. by spraying water at a cooling rate of 5° C./s–9° C./s, and is then air-cooled.

Further optionally, after the universal rolling, the flange surface is cooled to 480° C.-505° C. by spraying water at a cooling rate of 9° C./s–13° C./s, and is then air-cooled.

The rapid cooling after universal rolling is intended to prevent the precipitation of massive ferrite and pearlite, while avoiding the precipitation of bainite, so as to promote the formation of fine acicular ferrite as much as possible. A temperature interval for precipitation of pro-eutectoid ferrite and pearlite quickly goes by, the cooling rate is higher than a critical cooling rate of the two, and the upper limit is set; the flange surface is cooled by spraying water, providing the core sufficient cooling time by means of heat conduction. During final cooling, the full thickness of the flange is controlled within the temperature range of 480° C.-580° C., and fine acicular ferrite fully precipitates at an air cooling stage.

If the cooling rate of the flange surface is lower than 5° C./s, the cooling rate of the core will decrease, and massive ferrite or pearlite distributed in strips will precipitate, impairing the toughness and plasticity, and therefore the lower limit is set to 5° C./s; if the cooling rate is higher than 13° C./s, the total cooling time will be insufficient, the heat conduction of the core will be insufficient, and an initial temperature of air cooling will be high, resulting in the formation of a large amount of pearlite, impairing the toughness and plasticity, and therefore the upper limit is set to 13° C./s.

If the cooling temperature of the flange surface is lower than 480° C., the surface and nearby zones will be within an upper bainite precipitation interval, and more than 3% of bainite will be formed, while the acicular ferrite will be formed in the core zone, increasing the microstructure difference and impairing the thickness-direction properties, and therefore the lower limit is set to 480° C.; if the cooling temperature is higher than 580° C., the starting temperature of air cooling in the core will rise, and a large amount of granular ferrite will precipitate, forming broad acicular ferrite on the surface and nearby zones, impairing the toughness and thickness-direction properties, and therefore the upper limit is set to 580° C.

The flange of the extra thick hot rolled H section steel of the present invention is in a thickness range of 90 mm-150 mm, and in this case, the web is in a thickness range of 50 mm-120 mm.

Further optionally, the thickness range of the flange is 90 mm-115 mm.

Further optionally, the thickness range of the flange is 115 mm-150 mm.

Since the design of a heavy supporting structure requires certain strength and rigidity, the hot rolled H section steel required must have a flange thickness of not less than 90 mm, which has the lower limit of 90 mm; if the thickness exceeds 150 mm, a larger-sized beam blankt is required, the equipment investment is large, and the production difficulty is high; if the flange is too thick, the deforming penetration in rolling and controlled cooling penetration are limited, and therefore the upper limit is set to 150 mm.

According to the relevant requirements of structural design and the technical features of hot rolled H section steel, when the thickness of the flange is in the range of 90 mm-150 mm, the thickness of the web is 50 mm-120 mm in consideration of structural stability and production feasibility.

Tables 1-4 below respectively show chemical composition, production process parameters, microstructures and mechanical properties of Examples 1-10 provided by the present invention:

TABLE 1

Chemical composition (by wt %) of Examples 1-10 of the present invention

| No. | C | Si | Mn | P | S | Cr | Ni | Cu | V | Nb | Ti | Al | N | O | CEV/% |
|---|---|---|---|---|---|---|---|---|---|---|---|---|---|---|---|
| 1 | 0.04 | 0.15 | 0.81 | 0.010 | 0.004 | 0.71 | 0.03 | 0.11 | 0.047 | 0.044 | 0.011 | 0.014 | 0.0075 | 0.0042 | 0.34 |
| 2 | 0.05 | 0.19 | 0.85 | 0.013 | 0.003 | 0.80 | 0.01 | 0.13 | 0.042 | 0.047 | 0.013 | 0.012 | 0.0070 | 0.0039 | 0.37 |
| 3 | 0.07 | 0.26 | 0.90 | 0.014 | 0.004 | 0.84 | 0.01 | 0.17 | 0.051 | 0.053 | 0.015 | 0.022 | 0.0089 | 0.0041 | 0.41 |
| 4 | 0.06 | 0.21 | 0.95 | 0.011 | 0.003 | 0.89 | 0.02 | 0.20 | 0.048 | 0.055 | 0.014 | 0.020 | 0.0083 | 0.0055 | 0.42 |
| 5 | 0.08 | 0.30 | 0.62 | 0.011 | 0.003 | 0.92 | 0.02 | 0.27 | 0.086 | 0.029 | 0.022 | 0.020 | 0.0110 | 0.0021 | 0.40 |
| 6 | 0.09 | 0.33 | 0.69 | 0.013 | 0.003 | 0.95 | 0.01 | 0.24 | 0.085 | 0.033 | 0.021 | 0.025 | 0.0113 | 0.0023 | 0.43 |
| 7 | 0.10 | 0.31 | 0.75 | 0.012 | 0.003 | 0.93 | 0.03 | 0.33 | 0.089 | 0.039 | 0.023 | 0.027 | 0.0120 | 0.0036 | 0.45 |
| 8 | 0.11 | 0.39 | 0.73 | 0.014 | 0.002 | 0.96 | 0.01 | 0.35 | 0.089 | 0.038 | 0.025 | 0.023 | 0.0119 | 0.0031 | 0.47 |
| 9 | 0.10 | 0.35 | 0.79 | 0.010 | 0.003 | 0.95 | 0.03 | 0.39 | 0.096 | 0.040 | 0.023 | 0.029 | 0.0120 | 0.0029 | 0.47 |
| 10 | 0.11 | 0.38 | 0.72 | 0.011 | 0.002 | 0.97 | 0.02 | 0.39 | 0.093 | 0.040 | 0.024 | 0.024 | 0.0118 | 0.0030 | 0.47 |

TABLE 2

Main technological parameters of Examples 1-10 of the present invention

| | | | Break down rolling | Before universal rolling | | After universal rolling | |
|---|---|---|---|---|---|---|---|
| No. | Heating temperature/° C. | Heating time | Finish-rolling temperature/° C. | Cooling rate | Finish-cooling temperature/° C. | Cooling rate | Finish-cooling temperature/° C. |
| 1 | 1223 | 122 min | 1015 | 22° C./s | 793 | 6° C./s | 522 |
| 2 | 1245 | 126 min | 1023 | 23° C./s | 788 | 7° C./s | 519 |
| 3 | 1240 | 127 min | 1036 | 26° C./s | 769 | 7° C./s | 510 |
| 4 | 1256 | 130 min | 1040 | 25° C./s | 759 | 7° C./s | 506 |
| 5 | 1273 | 145 min | 1055 | 29° C./s | 736 | 9° C./s | 500 |
| 6 | 1271 | 149 min | 1069 | 32° C./s | 730 | 10° C./s | 496 |
| 7 | 1286 | 152 min | 1072 | 33° C./s | 721 | 11° C./s | 493 |
| 8 | 1297 | 164 min | 1077 | 35° C./s | 711 | 11° C./s | 489 |
| 9 | 1310 | 170 min | 1081 | 37° C./s | 709 | 13° C./s | 483 |
| 10 | 1311 | 171 min | 1086 | 36° C./s | 701 | 13° C./s | 481 |
| Range | 1200-1350 | ≥120 min | ≥1000 | ≥20° C./s | 700-800 | 5° C./s-13° C./s | 480-530 |

Note:
The temperatures and cooling rates mentioned in break down rolling and universal rolling refer to the flange surface.

TABLE 3

Microstructures of Examples 1-10 of the present invention

| No. | Thickness of flange/mm | Acicular ferrite | Average width dimension of acicular ferrite grains | Maximum difference of acicular ferrite in thickness direction | Bainite |
|---|---|---|---|---|---|
| 1 | 90 | 86% | 12 μm | 5% | <1% |
| 2 | 90 | 88% | 13 μm | 5% | <1% |
| 3 | 100 | 91% | 16 μm | 6% | <1% |
| 4 | 110 | 90% | 19 μm | 7% | <1% |
| 5 | 120 | 92% | 22 μm | 9% | 0 |
| 6 | 120 | 93% | 23 μm | 11% | 0 |

TABLE 3-continued

Microstructures of Examples 1-10 of the present invention

| No. | Thickness of flange/mm | Acicular ferrite | Average width dimension of a cicular ferrite grains | Maximum difference of acicular ferrite in thickness direction | Bainite |
|---|---|---|---|---|---|
| 7 | 130 | 93% | 29 μm | 13% | 0 |
| 8 | 140 | 95% | 32 μm | 13% | 0 |
| 9 | 150 | 97% | 36 μm | 14% | 0 |
| 10 | 150 | 95% | 39 μm | 15% | 0 |

According to the standard GB/T 2975, the extra thick hot rolled H section steel of the present invention is sampled at the part of the flange one sixth of the width from the end portion and one quarter of the thickness from outer surface. According to the standard GB/T 228.1, it is stipulated that the measured tensile yield strength at the room temperature should not be less than 460 MPa, the tensile strength should not be less than 540 MPa, and the elongation after fracture should not be less than 24.0%. According to the standard GB/T 229, the measured impact energy value at −20° C. should not be less than 80 J; according to the standard GB/T 5313, the measured thickness-direction properties should reach the grade Z35.

TABLE 4

Mechanical properties of Examples 1-10 of the present invention

| No. | Flange thickness | Yield strength $R_{eH}$/MPa | Tensile strength $R_m$/MPa | Elongation after fracture A/% | Impact energy −20° C. $KV_2$/J | Thickness-direction properties Z/% |
|---|---|---|---|---|---|---|
| 1 | 90 | 522 | 649 | 32.0 | 126, 114, 118 | 57 |
| 2 | 90 | 516 | 643 | 31.0 | 119, 110, 125 | 59 |
| 3 | 100 | 493 | 622 | 28.0 | 104, 106, 101 | 53 |
| 4 | 110 | 487 | 611 | 28.5 | 98, 109, 115 | 52 |
| 5 | 120 | 478 | 607 | 26.0 | 95, 113, 102 | 50 |
| 6 | 120 | 470 | 603 | 27.0 | 106, 104, 93 | 49 |
| 7 | 130 | 471 | 609 | 24.5 | 107, 102, 94 | 42 |
| 8 | 140 | 475 | 611 | 25.0 | 100, 99, 115 | 41 |
| 9 | 150 | 466 | 597 | 24.0 | 93, 100, 96 | 39 |
| 10 | 150 | 464 | 599 | 24.5 | 96, 84, 93 | 37 |

From the examples provided in Tables 1-4, it can be known that the extra thick hot rolled H section steel having a flange thickness of 90 mm-150 mm produced by the method of the present invention has a yield strength of 464 MPa-522 MPa at the room temperature, a tensile strength of 597 MPa-649 MPa, an elongation of fracture of 24.0-32.0%, an −20° C. impact energy of 84 J-126 J, and the thickness-direction properties exceeding the requirements of grade Z35.

The foregoing description are merely preferred embodiments of the present invention, but the scope of protection of the present invention is not limited thereto. Any changes or replacements that can be easily conceived by those skilled in the art within the technical scope disclosed by the present invention shall fall within the scope of protection of the present invention. Therefore, the scope of protection of the present invention shall be subject to the scope of protection defined by the claims.

The parts of the present invention that are not described in detail are known techniques to those skilled in the art.

The invention claimed is:

1. An extra thick hot rolled H section steel, containing, by mass, the following chemical components: 0.04-0.11% of C, 0.10-0.40% of Si, 0.40-1.00% of Mn, 0.40-1.00% of Cr, 0.10-0.40% of Cu, 0.020-0.060% of Nb, 0.040-0.100% of V, 0.010-0.025% of Ti, 0.010-0.030% of Al, 0.0060-0.0120% of N, not more than 0.015% of P, not more than 0.005% of S, not more than 0.0060% of O, and the balance Fe and trace residual elements, wherein 0.090%<Nb+V+Ti≤0.170%, 6.5≤(V+Ti)/N≤10.5, and the chemical components satisfy the condition of 0.30%≤CEV≤0.48% according to a calculation equation CEV=C+Mn/6+ (Cr+Mo+V)/5+ (Ni+Cu)/15, wherein at the part, one sixth of the width distance from an end portion and one quarter of the thickness from outer surface, of a flange of the H section steel, a microstructure contains, by area, 85-98% of acicular ferrite and the balance bainite or retained austenite, wherein the bainite content is not more than 2%, the length-width ratio of acicular ferrite is 2:1 to 5:1, and the ferrite has a grain width size of not more than 40 μm, and the difference of acicular ferrite contents in different zones through thickness of the flange is not more than 16%, wherein the H section steel has a flange thickness of 90 mm-150 mm, and wherein at the part, one sixth of the width distance from the end portion and one quarter of the thickness from outer surface, of the flange of the H section steel, the tensile yield strength at the room temperature is not less than 460 MPa, the tensile strength is not less than 540 MPa, an elongation after fracture is not less than 24.0%, the impact energy value at −20° C. is not less than 80 J, and the thickness-direction properties reach grade Z35.

2. The extra thick hot rolled H section steel according to claim 1, wherein the H section steel contains, by mass, the chemical components: 0.04-0.07% of C, 0.10-0.30% of Si, 0.80-1.00% of Mn, 0.40-0.90% of Cr, 0.10-0.25% of Cu, 0.040-0.060% of Nb, 0.040-0.080% of V, 0.010-0.015% of Ti, 0.010-0.020% of Al, 0.0060-0.0100% of N, not more than 0.015% of P, not more than 0.005% of S, not more than 0.0060% of O, and the balance Fe and trace residual elements, wherein 0.090%≤Nb+V+Ti≤0.130%, 6.5≤(V+Ti)/N≤8.5, and the chemical components satisfy the condition of 0.30%≤CEV≤0.43% according to the calculation equation CEV=C+Mn/6+ (Cr+Mo+V)/5+ (Ni+Cu)/15.

3. The extra thick hot rolled H section steel according to claim 2, wherein at the part, one sixth of the width distance from the end portion and one quarter of the thickness from outer surface, of the flange of the H section steel, the microstructure contains, by area, 85-91% of acicular ferrite and the balance bainite or retained austenite, wherein the bainite content is not more than 2%, the ferrite has a grain width size of not more than 20 μm, and the difference of acicular ferrite contents in different zones through thickness of the flange is not more than 9%.

4. The extra thick hot rolled H section steel according to claim 2, wherein at the part, one sixth of the width distance from the end portion and one quarter of the thickness from outer surface, of the flange of the H section steel, the microstructure contains, by area, 91-98% of acicular ferrite and the balance bainite or retained austenite, wherein the bainite content is not more than 1%, the ferrite has a grain width size of 20 μm-40 μm, and the difference of acicular ferrite contents in different zones through thickness of the flange is 9-16%.

5. The extra thick hot rolled H section steel according to claim 2, wherein at the part, one sixth of the width distance from the end portion and one quarter of the thickness from outer surface, of the flange of the H section steel, the tensile yield strength at the room temperature is not less than 460 MPa, the tensile strength is not less than 540 MPa, an elongation after fracture is not less than 24.0%, the impact energy value at −20° C. is not less than 80 J, and the thickness-direction properties reach grade Z35.

6. A production method for the extra thick hot rolled H section steel according to claim 2, comprising the following steps:
heating a beam blank at a heating temperature of 1200° C.-1350° C. for a heating time of 120 min-180 min;
break down rolling, wherein the surface temperature of the flange after rolling is not lower than 1000° C.; cooling with spray water at a cooling rate of not lower than 20° C./s, and rapidly cooling a flange surface to 700° C.-800° C., and then rolling with a universal rolling mill; and
after the universal rolling, rapidly cooling, by spraying water, the flange surface of the rolled piece to 480° C.-530° C. at a cooling rate of 5° C./s-13° C./s, then performing air cooling.

7. The production method for the extra thick hot rolled H section steel according to 6, wherein a beam blank undergoes the break down rolling, and the surface temperature of the flange is not lower than 1000° C. after rolling.

8. The extra thick hot rolled H section steel according to claim 1, wherein the H section steel contains, by mass, the chemical components: 0.07-0.11% of C, 0.30-0.40% of Si, 0.40-0.80% of Mn, 0.90-1.00% of Cr, 0.25-0.40% of Cu, 0.020-0.040% of Nb, 0.080-0.100% of V, 0.015-0.025% of Ti, 0.020-0.030% of Al, 0.0100-0.0120% of N, not more than 0.015% of P, not more than 0.005% of S, not more than 0.0040% of O, and the balance Fe and trace residual elements, wherein 0.130%<Nb+V+Ti≤0.170%, 8.5≤(V+Ti)/N≤10.5, and the chemical components satisfy the condition of 0.40%≤CEV≤0.48% according to the calculation equation CEV=C+Mn/6+ (Cr+Mo+V)/5+ (Ni+Cu)/15.

9. The extra thick hot rolled H section steel according to claim 8, wherein at the part, one sixth of the width distance from the end portion and one quarter of the thickness from outer surface, of the flange of the H section steel, the microstructure contains, by area, 85-91% of acicular ferrite and the balance bainite or retained austenite, wherein the bainite content is not more than 2%, the ferrite has a grain width size of not more than 20 μm, and the difference of acicular ferrite contents in different zones through thickness of the flange is not more than 9%.

10. The extra thick hot rolled H section steel according to claim 8, wherein at the part, one sixth of the width distance from the end portion and one quarter of the thickness from outer surface, of the flange of the H section steel, the microstructure contains, by area, 91-98% of acicular ferrite and the balance bainite or retained austenite, wherein the bainite content is not more than 1%, the ferrite has a grain width size of 20 μm-40 μm, and the difference of acicular ferrite contents in different zones through thickness of the flange is 9-16%.

11. The extra thick hot rolled H section steel according to claim 8, wherein at the part, one sixth of the width distance from the end portion and one quarter of the thickness from outer surface, of the flange of the H section steel, the tensile yield strength at the room temperature is not less than 460 MPa, the tensile strength is not less than 540 MPa, an elongation after fracture is not less than 24.0%, the impact energy value at −20° C. is not less than 80 J, and the thickness-direction properties reach grade Z35.

12. The extra thick hot rolled H section steel according to claim 1, wherein at the part, one sixth of the width distance from the end portion and one quarter of the thickness from outer surface, of the flange of the H section steel, the microstructure contains, by area, 85-91% of acicular ferrite and the balance bainite or retained austenite, wherein the bainite content is not more than 2%, the ferrite has a grain width size of not more than 20 μm, and the difference of acicular ferrite contents in different zones through thickness of the flange is not more than 9%.

13. The extra thick hot rolled H section steel according to claim 1, wherein at the part, one sixth of the width distance from the end portion and one quarter of the thickness from outer surface, of the flange of the H section steel, the microstructure contains, by area, 91-98% of acicular ferrite and the balance bainite or retained austenite, wherein the bainite content is not more than 1%, the ferrite has a grain width size of 20 μm-40 μm, and the difference of acicular ferrite contents in different zones through thickness of the flange is 9-16%.

14. A production method for the extra thick hot rolled H section steel according to claim 1, comprising the following steps:
heating a beam blank at a heating temperature of 1200° C.-1350° C. for a heating time of 120 min-180 min;
break down rolling, wherein the surface temperature of the flange after rolling is not lower than 1000° C.; cooling with spray water at a cooling rate of not lower than 20° C./s, and rapidly cooling a flange surface to 700° C.-800° C., and then rolling with a universal rolling mill; and
after the universal rolling, rapidly cooling, by spraying water, the flange surface to 480° C.-530° C. at a cooling rate of 5° C./s-13° C./s, then performing air cooling.

15. The production method for the extra thick hot rolled H section steel according to claim 9, wherein a beam blank undergoes the break down rolling, and the surface temperature of the flange is not lower than 1000° C. after rolling.

* * * * *